(12) United States Patent
Sunder et al.

(10) Patent No.: US 12,141,759 B2
(45) Date of Patent: Nov. 12, 2024

(54) DETERMINING UTILITY INFRASTRUCTURE AND CONNECTIVITY INTERRUPTIONS

(71) Applicant: International Business Machines Corporation, Armonk, NY (US)

(72) Inventors: Madhana Sunder, Poughkeepsie, NY (US); Noah Singer, White Plains, NY (US); James Mansfield Crafts, Warren, VT (US); Chris Muzzy, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 17/393,590

(22) Filed: Aug. 4, 2021

(65) Prior Publication Data
US 2023/0044197 A1 Feb. 9, 2023

(51) Int. Cl.
- *G06Q 10/20* (2023.01)
- *B64C 39/02* (2023.01)
- *G06Q 50/06* (2024.01)
- *B64U 101/30* (2023.01)

(52) U.S. Cl.
CPC .......... *G06Q 10/20* (2013.01); *B64C 39/024* (2013.01); *G06Q 50/06* (2013.01); *B64U 2101/30* (2023.01)

(58) Field of Classification Search
CPC ...... G06Q 10/20; G06Q 50/06; B64C 39/024; B64U 2101/30
See application file for complete search history.

(56) References Cited

U.S. PATENT DOCUMENTS

| | | | |
|---|---|---|---|
| 7,400,264 B2 | 7/2008 | Boaz | |
| 8,972,783 B2 | 3/2015 | Gupta | |
| 9,297,723 B1 * | 3/2016 | Hofmann | G06N 20/00 |
| 9,826,415 B1 | 11/2017 | Byrne | |
| 10,859,619 B2 | 12/2020 | Dzierwa | |
| 11,538,127 B1 * | 12/2022 | Lecocke | G06Q 50/265 |
| 2014/0047489 A1 * | 2/2014 | Nielsen | H04N 17/004 |
| | | | 725/107 |

(Continued)

FOREIGN PATENT DOCUMENTS

| WO | WO-2013037227 A1 * | 3/2013 | ............ G01R 19/165 |
|---|---|---|---|

OTHER PUBLICATIONS

Kim et al "Fault Diagnosis of Power Transmission Lines Using a UAV-Mounted Smart Inspection System", published Aug. 13, 2020 (Year: 2020).*

(Continued)

*Primary Examiner* — Andrew Chase Lakhani
(74) *Attorney, Agent, or Firm* — Monchai Chuaychoo

(57) ABSTRACT

An approach for determining an infrastructure service interruption is disclosed. The approach relies on utilizing UAVs (unmanned aerial vehicle) to map electronic signals (e.g., Wi-Fi, etc.) that emanates from building structures (e.g., residential, commercial, etc.). Electronic signals having a certain frequency or multiple frequencies may be used. Essentially, the approach can detect power/signal loss by comparing differences in Wi-Fi signal maps pre and post event (e.g., severe thunderstorm, etc.). The 24/7 event monitoring is carried out by using UAVs and the UAVs can operate on a regular or event driven schedule vs. continuously operating multiple fixed data collection units.

17 Claims, 8 Drawing Sheets

(56) References Cited

U.S. PATENT DOCUMENTS

| | | | |
|---|---|---|---|
| 2014/0047849 A1* | 2/2014 | Kramer | F02K 1/82 |
| | | | 29/889.22 |
| 2016/0028471 A1* | 1/2016 | Boss | H04W 28/0289 |
| | | | 455/406 |
| 2016/0046373 A1* | 2/2016 | Kugelmass | G06T 11/206 |
| | | | 701/8 |
| 2016/0373306 A1* | 12/2016 | Saha | H04L 41/06 |
| 2016/0373963 A1* | 12/2016 | Chechani | H04B 7/18504 |
| 2017/0085417 A1* | 3/2017 | O'Reirdan | H04L 41/0668 |
| 2017/0302362 A1* | 10/2017 | High | H04W 24/02 |
| 2017/0302511 A1 | 10/2017 | Foster | |
| 2018/0019910 A1* | 1/2018 | Tsagkaris | H04W 24/02 |
| 2018/0314994 A1* | 11/2018 | Katz | G06N 20/00 |
| 2020/0039645 A1* | 2/2020 | Soryal | B64C 39/024 |
| 2020/0084639 A1* | 3/2020 | Carpenter | G08G 5/0091 |
| 2020/0096548 A1 | 3/2020 | Dzierwa | |
| 2020/0235607 A1 | 7/2020 | Kanarellis | |

OTHER PUBLICATIONS

"A system and method to autonomously migrate a virtual machine based on cluster heath status", An IP.com Prior Art Database Technical Disclosure, Authors et. al.: Disclosed Anonymously, IP.com No. IPCOM000229290D, IP.com Electronic Publication Date: Jul. 18, 2013, 3 pages.

"Automated Recovery After a Power Disruption in Telecom Equipment", An IP.com Prior Art Database Technical Disclosure, Authors et al.: Disclosed Anonymously, IP.com No. IPCOM000252301D, IP.com Electronic Publication Date: Jan. 3, 2018, 9 pages.

"Prevent Unexpected Data Access Interruption Caused By Powering Off A Storage System", An IP.com Prior Art Database Technical Disclosure, Authors et al.: Disclosed Anonymously, IP.com No. IPCOM000209737D, IP.com Electronic Publication Date: Aug. 12, 2011, 3 pages.

Buis, Juan, "How to create a really cool Wi-Fi map of your neighborhood", TNW News, Oct. 12, 2016, 6 pages, <https://thenextweb.com/news/wi-fi-wardriving-easy>.

Medeisis et al., "ISM-Advanced: Improved Access Rules for Unlicensed Spectrum", 2014 IEEE International Symposium on Dynamic Spectrum Access Networks (DYSPAN), 13 pages.

Pack, Scott James, "Multi-Rotor -- Aided Three-Dimensional 802.11 Wireless Heat Mapping", A thesis submitted to the faculty of Brigham Young University in partial fulfillment of the requirements for the degree of Master of Science, Mar. 18, 2014, 95 pages, <https://scholarsarchive.byu.edu/cgi/viewcontent.cgi?referer=&httpsredir=1&article=5014&context-etd>.

Serrano et al., "Robot localization using WiFi signal without intensity map", DRAFT. Accepted in WAF'2004, Mar. 2004, 11 pages.

Thewan et al., "Assessment of WiFi RSS using Design of Experiment for Mobile Robot Wireless Positioning System", 19th International Conference on Information Fusion, Heidelberg, Germany, Jul. 5-8, 2016, 7 pages.

* cited by examiner

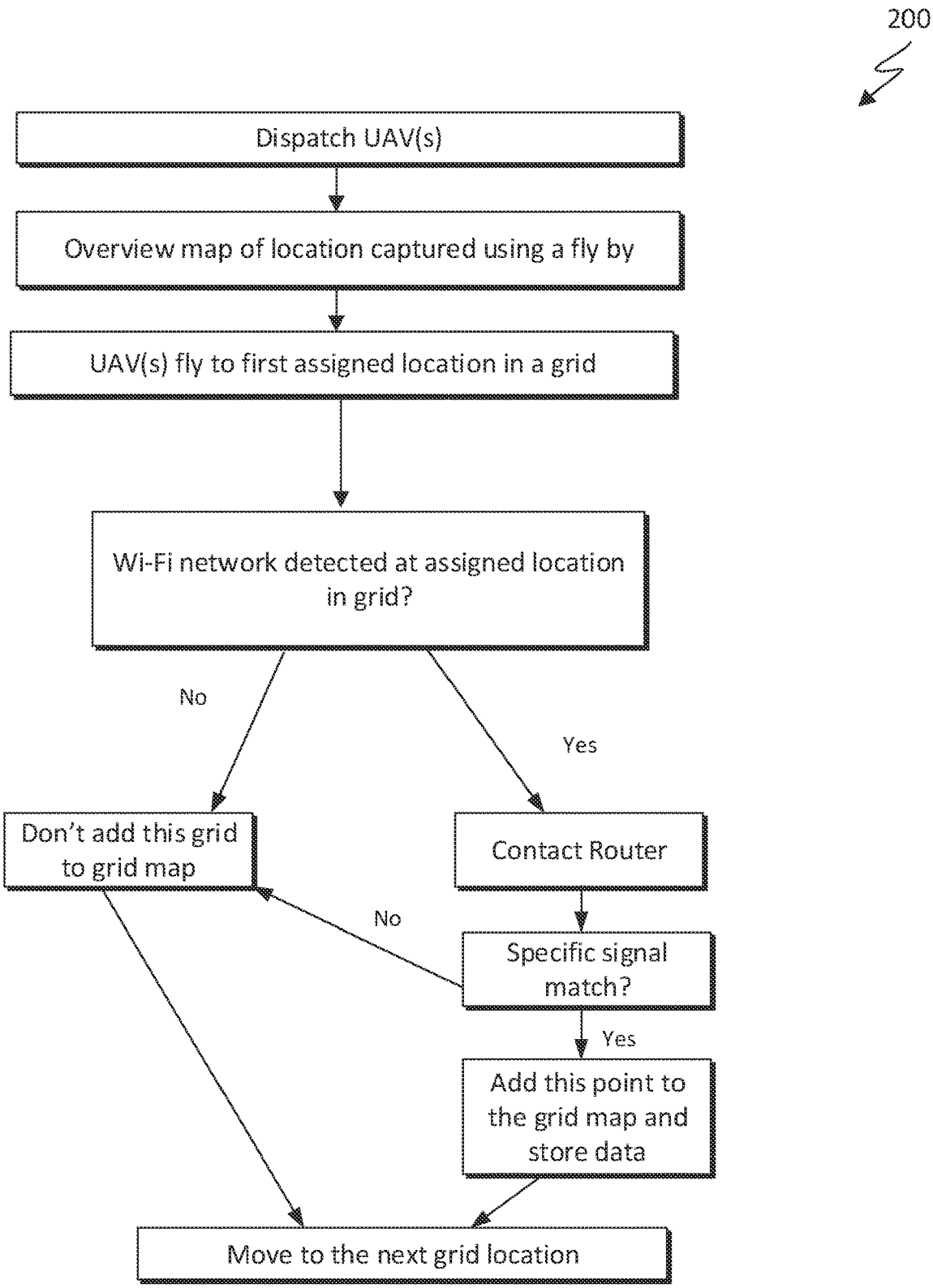
FIG. 2  (Creating GRID points)

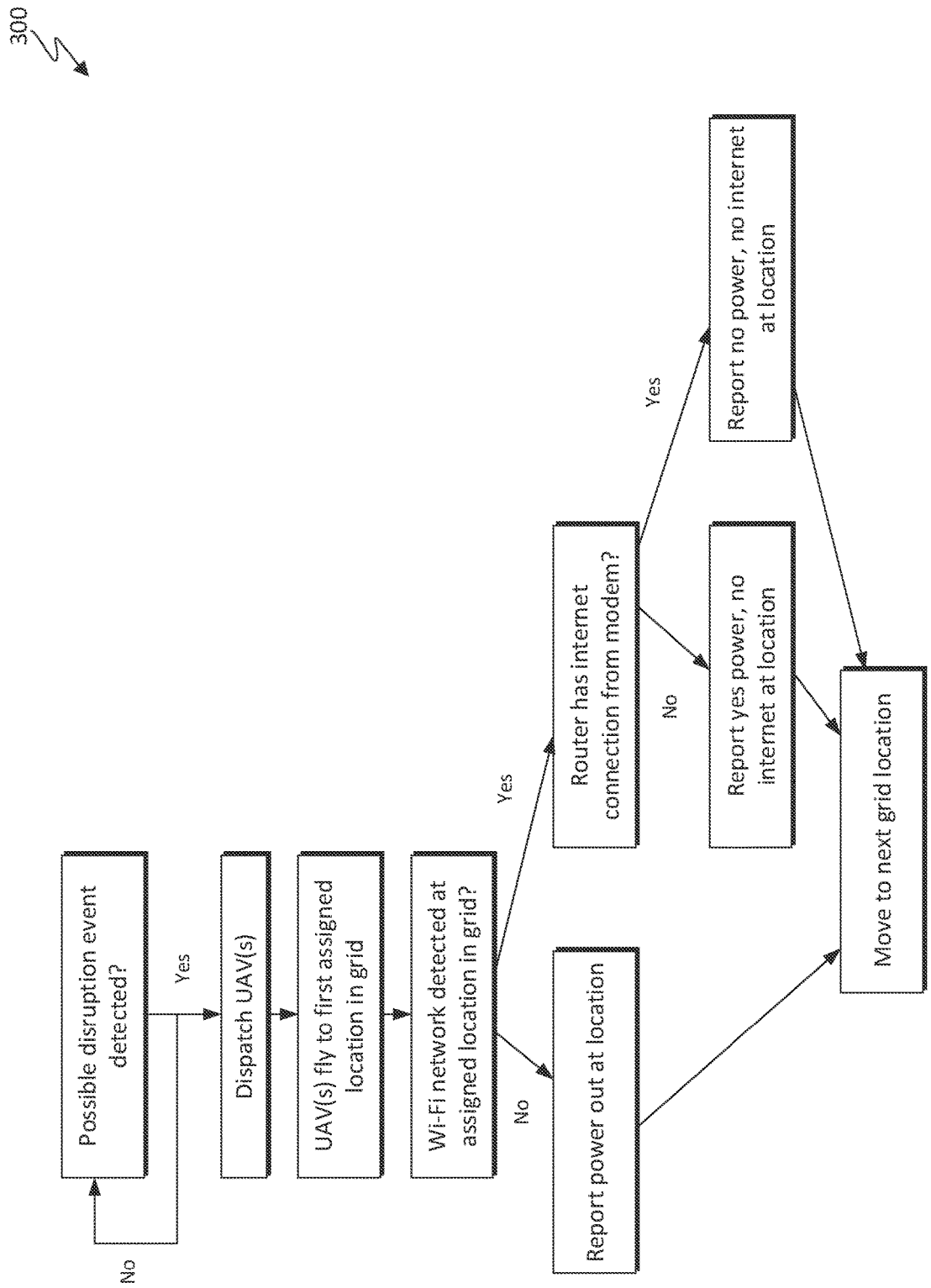
FIG. 3A (Disruption based mapping)

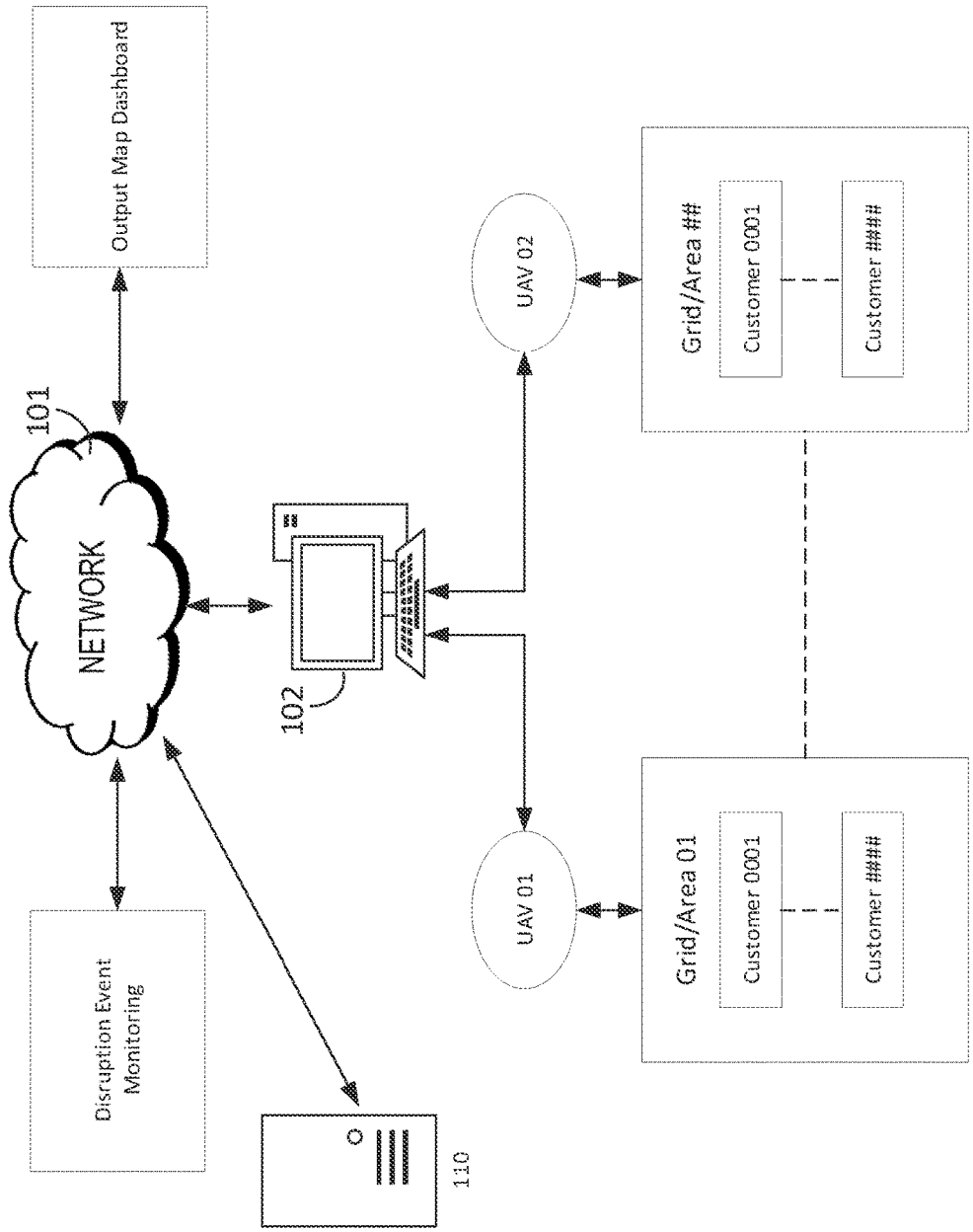
FIG. 3B  *(Network diagram)*

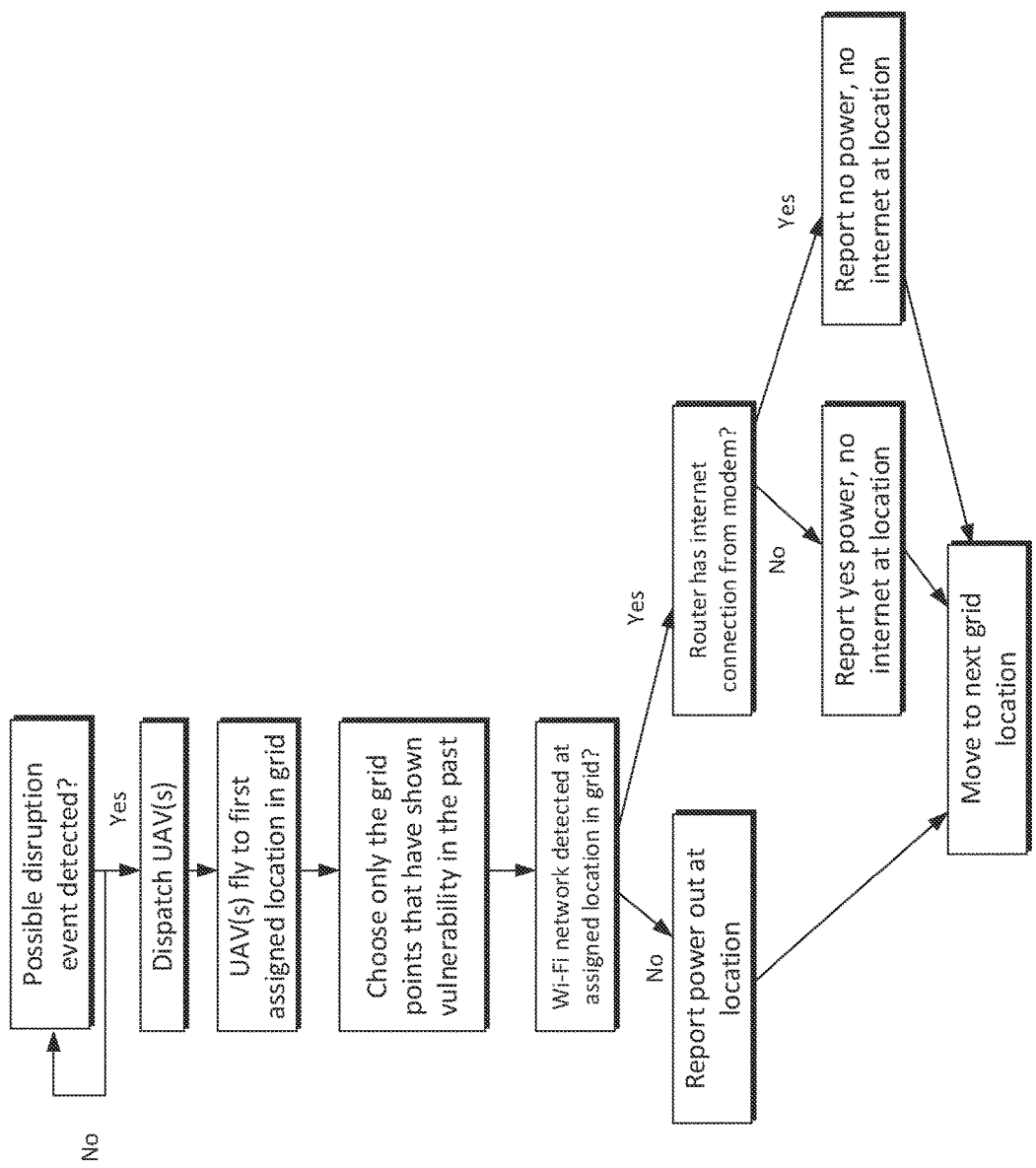
FIG. 4 *(Enhanced Disruption based mapping 1)*

(Enhanced Disruption based mapping 2)

DETERMINING UTILITY INFRASTRUCTURE AND CONNECTIVITY INTERRUPTIONS

BACKGROUND

The present invention relates generally utility infrastructure, and more particularly to detecting a disruption to power and communication services.

Outages, such as a disruption in power or internet can result in huge revenue or business loss for an enterprise. These outages can affect residential customers in adverse manner if coupled with a severe weather event.

Reporting and/or detecting outages may rely on customer self-reporting or utilizing meters with the ability to end a "last gasp" signal to the head-end system upon losing power or by being polled.

SUMMARY

Aspects of the present invention disclose a computer-implemented method, a computer system and computer program product for determining an infrastructure service interruption. The computer implemented method may be implemented by one or more computer processors and may include, determining an initial electronic signal mapping of an infrastructure service area; monitoring the infrastructure service area; determining a subsequent electronic signal mapping of the infrastructure service area; analyzing the subsequent electronic signal mapping; and outputting a result of the analysis.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which:

FIG. 2 is a high-level flowchart of creating grid points, illustrating an operation of another aspect of detection component 111, designated as process 200, in accordance with an embodiment of the present invention;

FIG. 3A is a high-level flowchart relating to disruption based mapping, illustrating the operation of another aspect of detection component 111, designated as process 300, in accordance with an embodiment of the present invention;

FIG. 3B is a functional block diagram illustrating a network connectivity between UAVs, incoming event data and company server during a disruption event, in accordance with an embodiment of the present invention;

FIG. 4 is a high-level flowchart relating to enhanced disruption based mapping 1, illustrating the operation of another aspect of detection component 111, designated as process 400, in accordance with an embodiment of the present invention;

DETAILED DESCRIPTION

Figure 1A:
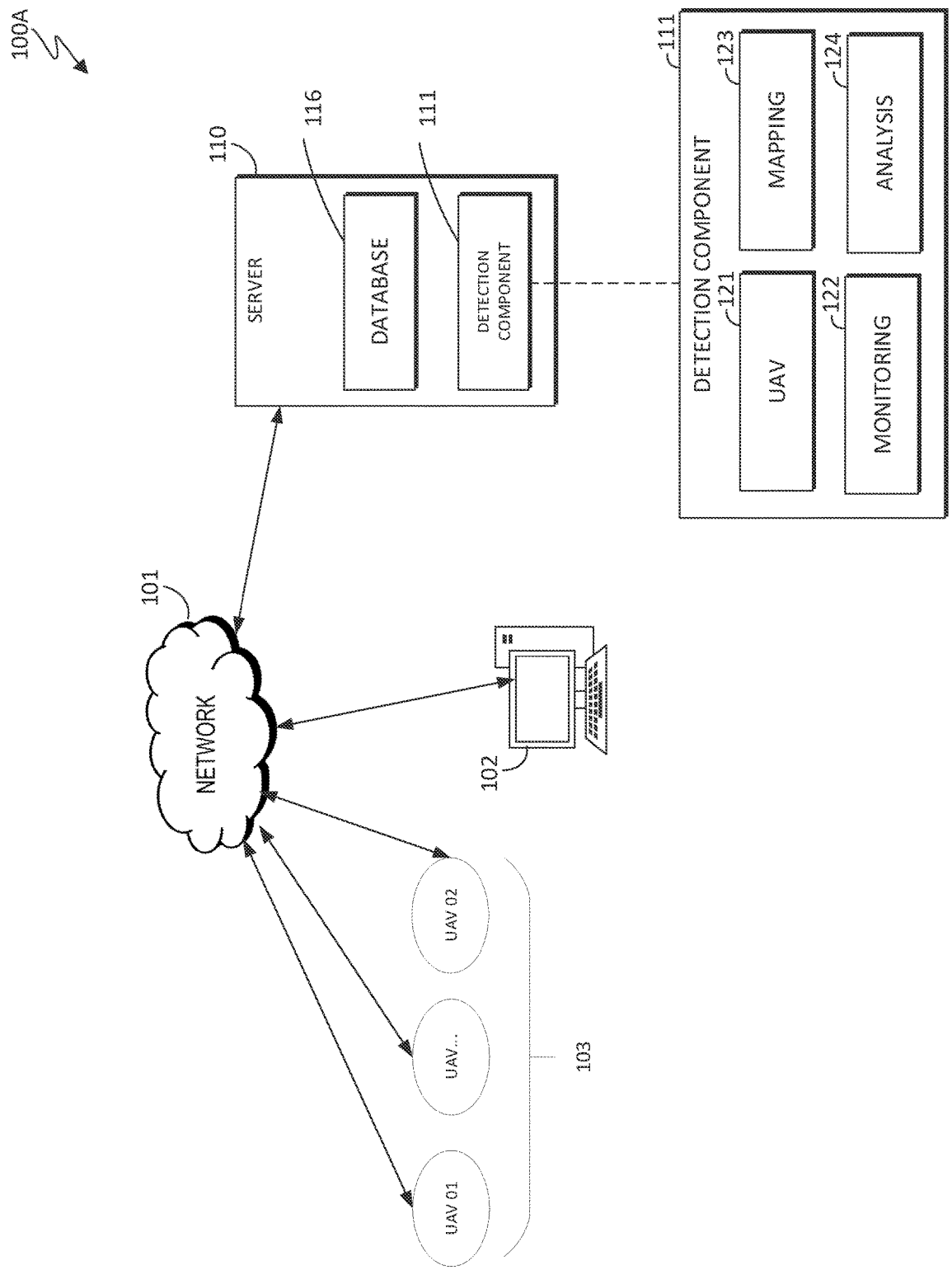
FIG. 1A is a functional block diagram illustrating a disruption detection environment, designated as 100A, in accordance with an embodiment of the present invention.

Current methods for determining the extent of internet and power outage, in rural areas or areas with older infrastructure, relies primarily on customer reporting, whereby, the customer has to call up the service provider for reporting disruptions to their power or internet. In some instances, the customer's cell phone may not be equipped with a Wi-Fi plan or has poor connectivity. In this case the customer has no means of informing the service provider about internet or power loss. Many customers assume that other customers are reporting the issue. The current methodology, of customer-based reporting, is extremely slow, solely relies on the customer, disruptive etc.

Embodiments of the present invention recognizes the deficiencies in the current state of art and provides an approach for addressing those deficiencies. One aspect of an embodiment of the present invention provides an approach that can quickly and effectively detect outages. The approach relies on utilizing UAVs (unmanned aerial vehicle) to map electronic signals (that are commonly used such as Wi-Fi, etc.) that emanates from building structures (e.g., residential, commercial, etc.). Electronic signals having a certain frequency or multiple frequencies may be used. Essentially, the approach can detect power/signal loss by comparing differences in Wi-Fi signal maps pre and post event (e.g., severe thunderstorm, etc.). The 24/7 event monitoring is carried out by using UAVs and the UAVs can operate on a regular or event driven schedule vs. continuously operating multiple fixed data collection units.

Advantages provided by various embodiments of the present inventions may include, but it is not limited to, (i) the approach can detect power/signal loss over a broad geographic area and not wired connections in a system cluster and (ii) the approach does not require Ethernet cabling and as a result can be easily deployed to monitor power/signal loss in remote/rural areas and can also monitor very large residential/commercial areas without requiring extensive infrastructure.

There are three types of models used during data processing and/or analysis: (1) disruption based mapping, (2) enhanced disruption based mapping which has two kinds and (3) value based mapping. In one embodiment survey area may also be adjusted based on a customer subscription.

In some embodiment of the present invention, the approach can utilize one or more UAVs that can sense and map Wi-Fi or related electronic signals in a particular location that includes, (i) comparing a map of current signals to historical signal data, (ii) signal mapping is carried out regularly and following a disruption event or events, (iii) 24/7 monitoring of disruptive events, (iv) reporting differences in signal to a central data processing location following a disruptive event, (v) generating a map of vulnerable areas of a neighborhood or location based on historical data and conducting surveys of vulnerable areas first following a disruptive event and (vi) survey area also considers data input such as local weather, seismic data, cosmic data, existing foliage etc. for refining survey mapping.

In some embodiments of the present invention, the approach may include the use of UAVs that sense and map electronic signals in a particular location by, comparing a map of current signals to historical signal data, reporting differences to a central data processing location and differences in data are mapped.

In some embodiments of the present invention, the approach may include the use machine learning (ML) to process and analyze the mapping data. For example, a top down aerial view optical map of the location (i.e., neighborhood) is obtained first and stored. ML is utilized to identify types of dwelling structures (e.g., mobile homes, multi-story buildings, attached homes, individual homes, offices etc.) belonging to a customer/client. Based on this data starting grid points are created and examined for vendor specific Wi-Fi signals. If all conditions have been satisfied grid points are stored as a combination of location, Wi-Fi signal frequency, strength etc. The map is updated to represent grid points with Wi-Fi signals.

In some embodiments of the present invention, the approach can provide a 24/7 monitoring of the neighborhood for weather, seismic, cosmic events, civil unrest etc. using various inputs such as, weather radar, weather.com, new reports, seismic monitors, space weather prediction center and etc.

In some embodiments of the present invention may rely on a customer's wireless modem to communicate directly with UAVs if there are significant differences in electronic signals that are not detected, post event. For example, during a UAV's flyby, the UAV can be informed about presence/absence of internet connectivity by the customer's wireless modem.

In some embodiments of the present invention, if significant differences in Wi-Fi signal are observed the systems can perform an automatic call home and informs the power service provider of a possible power loss situation. Furthermore, the customer may be pinged for power loss confirmation as well. The overall power loss map information is relied to the service provider as well.

In some embodiments of the present invention, a map of vulnerable areas of a neighborhood or location is generated based on historical periodic survey data and in one embodiment the grid points contained in the vulnerable zone may be surveyed first compared to other areas, in order, to enable a quick damage survey following a disruptive event. Furthermore, priority may be given for certain vulnerable population, higher subscription paying customers etc. as well.

In some embodiments of the present invention, the survey area may take into account local weather event, seismic data, visual damage etc. and may predict grid points that have sustained the most amount of damage. In this scenario, these areas are surveyed first.

In some embodiments of the present invention, the survey area may be based on user subscription. Customers who pay a certain rate may get survey priority over customers who selected a lower value plan.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1A is a functional block diagram illustrating a disruption detection environment, designated as 100A, in accordance with an embodiment of the present invention. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims.

Disruption detection environment 100A includes network 101, computing device 102, UAVs (unmanned aerial vehicle) 103 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110 and other computing devices (not shown) within disruption detection environment 100A. It is noted that other computing devices can include, but is not limited to, any electromechanical devices capable of carrying out a series of computing instructions.

Computing devices 102 are computing devices that used by a service provider company to monitor outages (e.g., communication, power, etc.). Computing devices 102 can communicate directly/indirectly to other monitoring devices within the infrastructure, such as smart power meters, communication nodes at street level, IoT devices and etc.

UAVs (unmanned aerial vehicle) 103 are autonomous vehicles that are capable of performing the following, but it is not limited to, aerial survey of customer dwelling within an infrastructure service area, detecting electromagnetic signals from dwelling of a customer, detecting/capturing of audio/visual images and repairs to an infrastructure service device in the field.

Server 110 and computing devices 102 can be a standalone computing device, a management server, a web server, a mobile computing device, or any other electronic device or computing system capable of receiving, sending, and processing data. In other embodiments, server 110 and computing devices 102 can represent a server computing system utilizing multiple computers as a server system, such as in a cloud computing environment. In another embodiment, server 110 and computing devices 102 can be a laptop computer, a tablet computer, a netbook computer, a personal computer (PC), a desktop computer, a personal digital assistant (PDA), a smart phone, or any other programmable electronic device capable of communicating other computing devices (not shown) within disruption detection environment 100A or 100B via network 101. In another embodiment, server 110 and computing devices 102 represents a computing system utilizing clustered computers and components (e.g., database server computers, application server computers, etc.) that act as a single pool of seamless resources when accessed within disruption detection environment 100A.

Embodiment of the present invention can reside on server 110 or on computing devices 102. Server 110 includes detection component 111 and database 116.

Detection component 111 provides the capability of detecting service interruption/disruption of a commodity/utility (e.g., internet, phone, electrical power, etc.) to a client (i.e., customers). Detection component 111 contains sub-components: UAV component 121, monitoring component 122, mapping component 123 and analysis component 124.

Database 116 is a repository for data used by detection component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within disruption detection environment 100A, provided that detection component 111 has access to database 116. Database 116 may store information associated with, but is not limited to, UAV instructions/commands, devices/equipment used by a utility infrastructure, weather-related data, social-media data, crowd-sourced data, internet devices/equipment used by an internet service provider and computing devices and/or equipment used by communication service company.

As is further described herein below, UAV component 121 of the present invention provides the capability of communicating and instructing UAV (i.e., drones) to perform various tasks. The tasks can include, but it is not limited to, flying above residential to detect/sense electronic signals (e.g., Wi-Fi, Bluetooth, etc.) and repairs to an infrastructure service device in the field. UAV component 121 can handle multiple UAVs simultaneously.

As is further described herein below, monitoring component 122 of the present invention provides the capability of retrieving and/or receiving data (e.g., news, weather, space weather, etc.) from data servers that provides/host those particular type of data. For example, monitoring component 122 can scan (24/7) information that may impact the client's service area. These inputs can include, but it is not limited to, weather radar, general weather website, news report, seismic monitors, space weather prediction center and clients self-reporting, etc.

In some embodiments, monitoring component 122 may retrieve data from sensors (out in the field) belonging to the utility company or publicly available IoT devices (e.g., live webcams, etc.) to determine the overall status of the infrastructure.

As is further described herein below, mapping component 123 of the present invention provides the capability of detecting and saving the electronic signals emanating from structures (client location) on to a map. For example, an aerial view of an optical map is used by UAVs to survey a residential neighborhood to notate the location (GPS) of electronic signal metric. The electronic signal metric can include, but is not limited to, signal frequency, signal strength and type of signal, etc. UAVs are equipped with electronic signal detection and identification sensors. UAVs can send real-time site survey information back to server 110 or can transmit data as the memory storage in the UAV reaches a certain quota.

As is further described herein below, analysis component 124 of the present invention provides the capability of determining, by leveraging machine learning (ML), whether there has been a disruption/interruption of service to the client based on, but it is not limited to, mapping data from UAVs and data received from monitoring component 122.

Analysis component 124 can compare the current mapping information against a historical signal mapping to determine if there is a significance difference in the data. There are three types of mapping analysis used to determine if there has been an outage (e.g., disruption based mapping, enhanced disruption based mapping 1 and enhanced disruption based mapping 2).

Generally, disruption base mapping has the following features: (i) UAV home base carries out a 24/7 monitoring of the neighborhood for weather, seismic, cosmic events using various inputs-weather radar, weather.com, new reports, seismic monitors, space weather prediction center etc., (ii) following a storm, high winds, major weather events or any other event that could cause power/internet disruption UAVs are sent for Wi-Fi mapping. Maps are compared for differences in Wi-Fi signal strength, signal distribution pre and post event, (iii) if significant differences in Wi-Fi signals are not detected, post event, the wireless modem, at a customer's home, may directly communicate with the UAVs, during their flyby, and inform about presence/absence of internet connectivity. In one embodiment the UAVs can directly connect with the customer's wireless modem and check for internet connectivity and (iv) if significant differences in Wi-Fi signal are observed the system does an automatic call home and informs the power service provider of a possible power loss situation. Alternatively, the customer may be pinged for power loss confirmation as well. The overall power loss map information is relied to the service provider as well.

Other features/embodiment of disruption based mapping can include ability of the system to directly communicate with the customers via VOIP, Wi-Fi calling, visual or audio means etc. and prompt a yes or no input for internet availability. Based on the response an internet loss of coverage map is quickly plotted and transmitted to the service provider. The flowchart from FIG. 3A can referred to in order to understand disruption based mapping.

Generally, enhanced disruption based mapping 1 has the following features: (i) a map of vulnerable areas of a neighborhood or location is generated based on historical periodic survey data and in one embodiment the grid points contained in the vulnerable zone may be surveyed first compared to other areas, in order, to enable a quick damage survey following a disruptive event. The flowchart from FIG. 4 can referred to in order to understand enhanced disruption based mapping.

Generally, enhanced disruption based mapping 2 has the following features: (i) the survey area may take into account local weather event, seismic data, visual damage etc. and may predict grid points that have sustained the most amount of damage. In this case these areas are surveyed first. The flowchart from FIG. 5 can referred to in order to understand disruption based mapping.

Figure 1B:
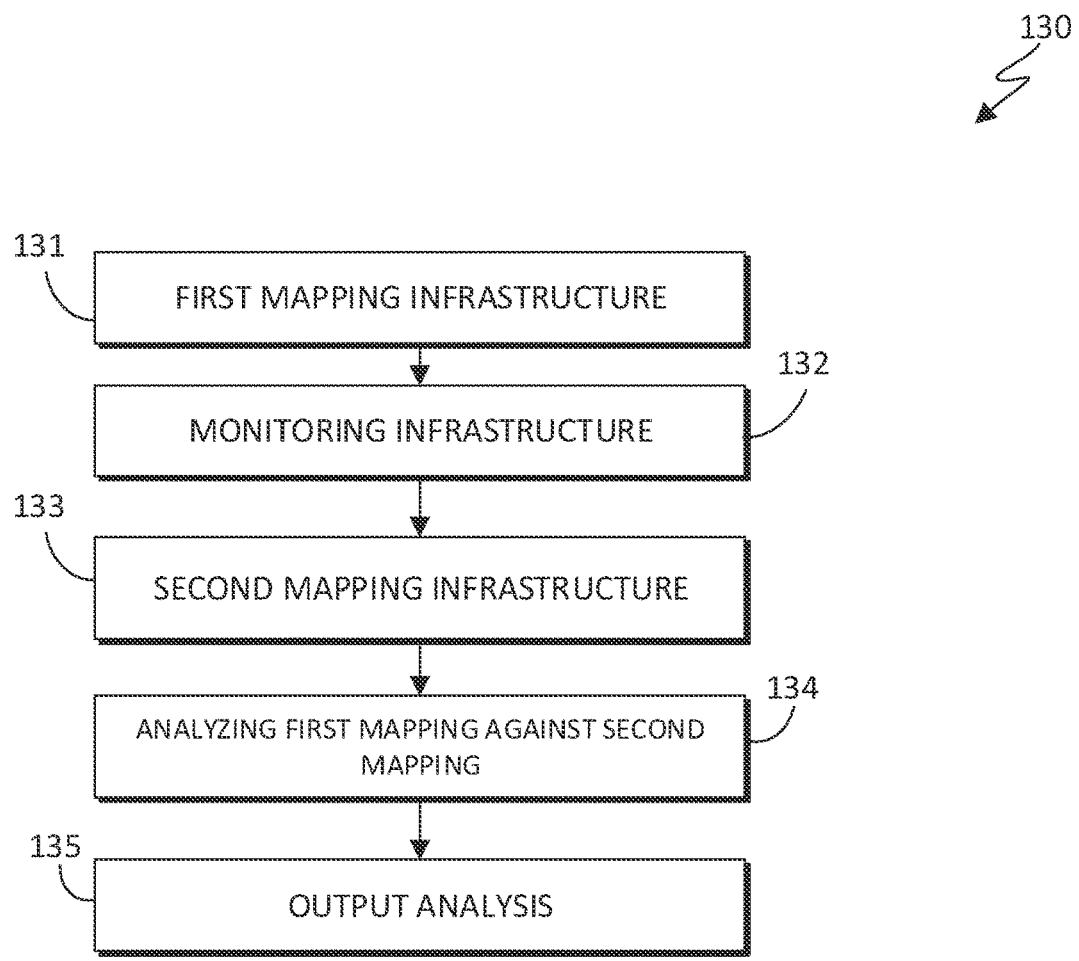
FIG. 1B is high-level flowchart illustrating process for detection component 111, designated as process 130, in accordance with an embodiment of the present invention.

FIG. 1B is high-level flowchart illustrating steps for detection component 111, designated as process 130, in accordance with an embodiment of the present invention. Process 130 begins with step 131 and ends in step 135.

Figure 5:
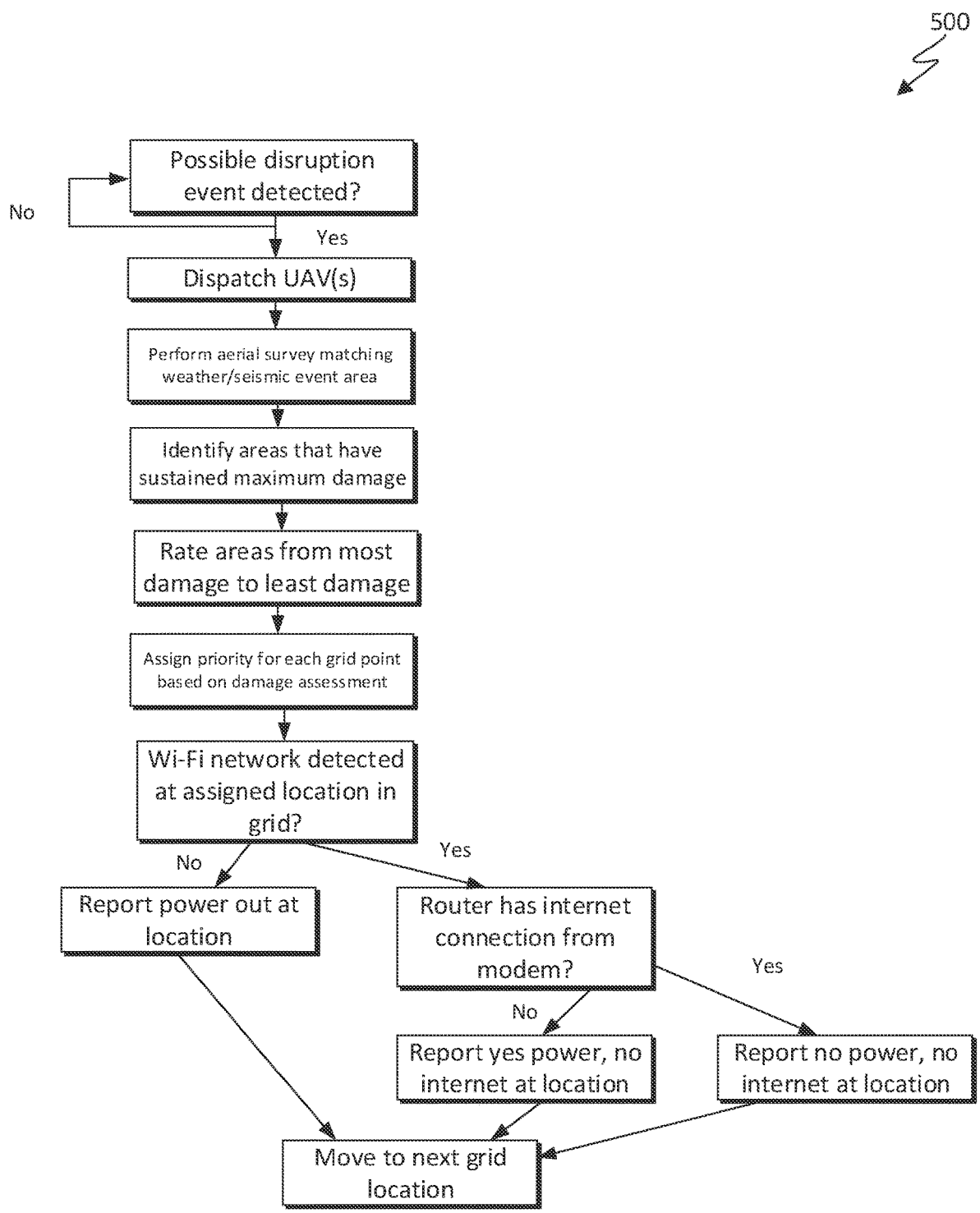
FIG. 5 is a high-level flowchart relating to enhanced disruption based mapping 2 illustrating the operation of another aspect of detection component 111, designated as process 500, in accordance with an embodiment of the present invention.

Detection component 111 maps an existing infrastructure (step 131). In an embodiment, detection component 111, through mapping component 123, maps an existing infrastructure connectivity. This would be considered mapping pre/prior to any disruption in service (i.e., a first mapping). FIGS. 3-5 will explain this process of mapping in greater details.

Detection component 111 monitors the infrastructure (step 132). In an embodiment, detection component 111, through monitoring component 122, monitors a connectivity of an infrastructure.

Detection component 111 maps the infrastructure (step 133) again from step 131. In an embodiment, detection component 111, through mapping component 123, maps the existing infrastructure connectivity. This would be considered mapping post/after to any disruption in service (i.e., a second mapping).

Detection component 111 analyzes the pre mapping (i.e., first mapping) against the post mapping (i.e., second mapping) (step 134). In an embodiment, detection component 111, through analysis component 124, analyzes the infrastructure connectivity to determine if there is an interruption/disruption of service.

Detection component 111 outputs the analysis (step 135). Based on the analysis, detection component 111, in the same embodiment, can output the result(s) to the users. The result (e.g., screen output, printed report, alerts on a smartphone/wearable device, etc.) can denote which customer dwelling or a group of dwellings has an outage (e.g., power, internet, etc.), which utility device/sensors are inoperable, any obstacles (such as down powerline, trees, vehicles) that may have impeded the utility service crew and how/where to send the utility service crew.

FIG. 2 is a high-level flowchart of creating grid points, illustrating the operation of detection component 111, designated as 200, in accordance with an embodiment of the present invention. Process 200 has the following steps/features: (1) sending UAVs to a grid location (2) detect electronic signals (e.g., WiFi, etc.), (3) adding/storing the electronic signal to a map (assuming there's a valid signal) and (4) move to the next location in the grid to repeat step 1-3 until a map is created. It is noted that a size of the map is adjustable by the user/system.

FIG. 3A is a high-level flowchart relating to disruption based mapping, illustrating the operation of detection component 111, designated as 300, in accordance with an embodiment of the present invention. Process 300 has the following steps/features: (1) continuous monitoring of events such as local weather, storms, civil unrest, etc. to determine if a possible disruption has occurred, (2) If event may have occurred, dispatch UAV(s) to start scanning the grid of customer homes/buildings where vendor specific Wi-Fi signals are expected to be present, (3) at each location in the grid, first check if a Wi-Fi network is present; if not then report power outage, (4) if there is a Wi-Fi network, ping the network to determine if the network has internet connectivity; if yes, report power on and internet on; if no, report power on, internet off and (5) Once assessment at current location is complete, move to the next location in the grid.

FIG. 3B is a functional block diagram illustrating a network connectivity between UAVs, incoming event data and company server during a disruption event, in accordance with an embodiment of the present invention.

FIG. 4 is a high-level flowchart relating to enhanced disruption based mapping 1, illustrating the operation of detection component 111, designated as 400, in accordance with an embodiment of the present invention. Process 400 has the following steps/features: (1) continuous monitoring of events such as local weather, storms, civil unrest, etc. to determine if a possible disruption has occurred, (2) if event may have occurred, dispatch UAV(s) to start scanning the grid of customer homes/buildings where vendor specific Wi-Fi signals are expected to be present, (3) choose grid points that have shown vulnerability in the past, (4) at each vulnerable grid point, first check if a Wi-Fi network is present; if not then report power outage, (4) if there is a Wi-Fi network, ping the network to determine if the network has internet connectivity; if yes, report power on and internet on; if no, report power on, internet off and (5) once assessment at current location is complete, move to the next vulnerable grid point.

FIG. 5 is a high-level flowchart relating to enhanced disruption based mapping 2 illustrating the operation of detection component 111, designated as 500, in accordance with an embodiment of the present invention. Process 500 has the following steps/features: (1) continuous monitoring of events such as local weather, seismic data etc. to determine if a possible disruption has occurred, (2) if event may have occurred, dispatch UAV(s) to start scanning the grid of customer homes/buildings where vendor specific Wi-Fi signals are expected to be present, (3) perform an aerial survey over an area, of a particular neighborhood, that overlaps with the recorded weather/seismic event path, (4) supervised ML is utilized to identify damage to existing dwelling structures—mobile homes, multi-story buildings, attached homes, individual homes, offices, warehouses etc., (5) areas surrounding the structures are imaged as well for damage as well and (6) images pertaining to structural damage, fallen foliage, downed power lines, flooding, water logging, hail, ice, fire etc. may be utilized for ML training purposes.

In another embodiment, steps may include, (1) past and present images may be compared for differences and based on this data a new Wi-Fi survey map containing grid points with the most damage to least damage is created, (2) grid points are assigned priority based on damage assessment, (3) at assigned grid point, first check if a Wi-Fi network is present; if not then report power outage, (4) if there is a Wi-Fi network, ping the network to determine if the network has internet connectivity; if yes, report power on and internet on; if no, report power on, internet off, and (5) once assessment at current location is complete, move to the next grid point.

In some embodiments, another mapping method is provided, a value based mapping. This mapping is based on user subscription. Customers who pay a certain rate may get survey priority over customers who selected a lower value plan.

Figure 6:
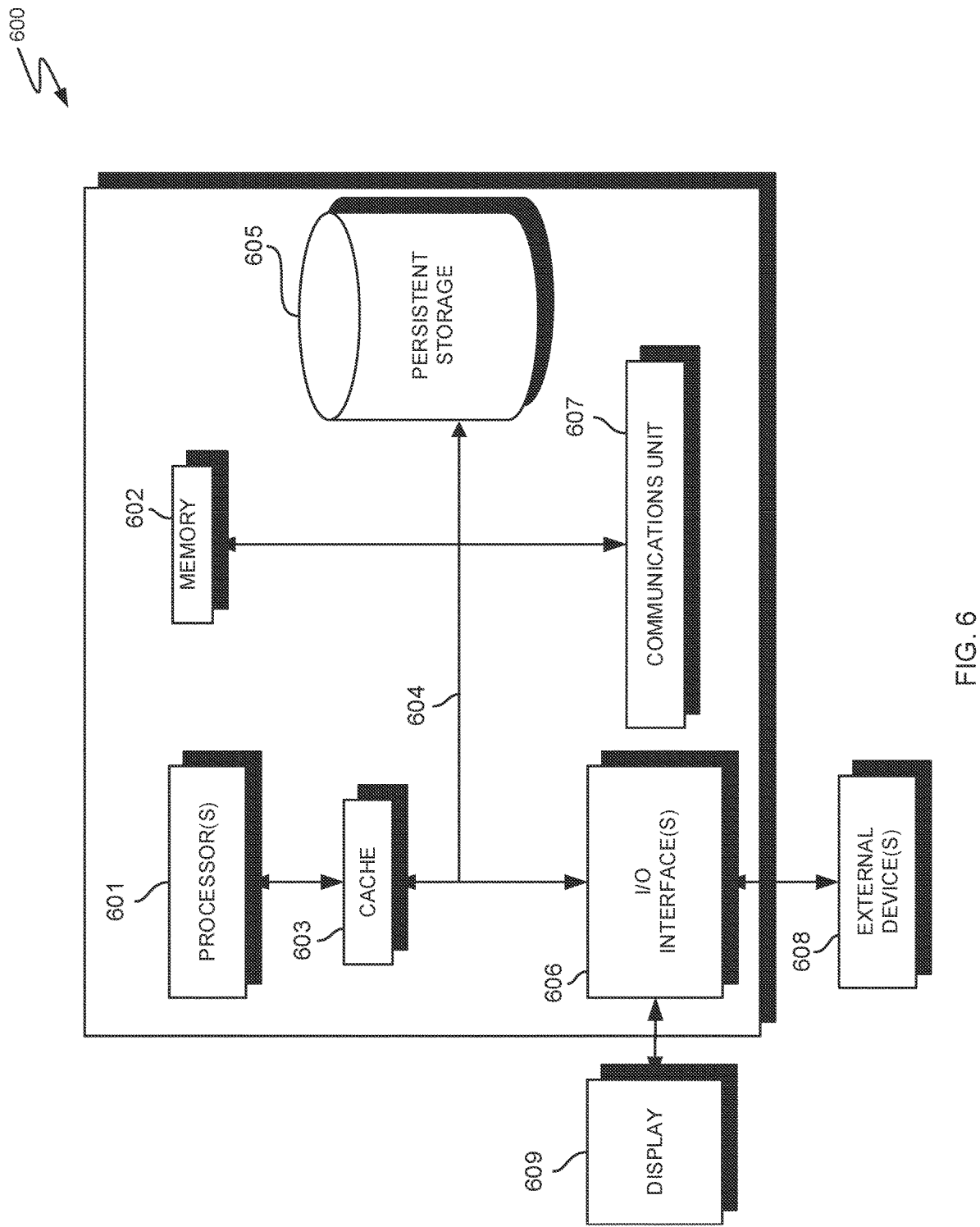
FIG. 6 depicts a block diagram, designated as 600, of components of a server computer capable of executing the detection component 111 within the disruption detection environment, of FIG. 1, in accordance with an embodiment of the present invention.

FIG. 6, designated as 600, depicts a block diagram of components of detection component 111 application, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

FIG. 6 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data (e.g., software and data x10) used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Detection component 111 can be stored in persistent storage 605 for access and/or execution by one or more of the respective processor(s) 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data (e.g., detection component 111) used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Program instructions and data (e.g., detection component 111) used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for determining an infrastructure service interruption, the computer-implemented method comprising:
    determining an initial electronic signal mapping of an infrastructure service area based on an electronic signal metric and customer subscription type, wherein the infrastructure service area consists of one or more customer dwellings serviced by electrical power and internet service further comprising:
        obtaining a top-down aerial view over the infrastructure service area;
        instructing one or more unmanned aerial vehicle (UAVs) to survey the infrastructure service area by measuring the initial electronic signal from a wireless modem communicating directly with the one or more UAVs at a first time interval, wherein the electronic signal metric consists of signal strength, signal frequency and signal type; and
        creating one or more grid points on an initial grid map, wherein the initial grid map contains the top-down aerial view, based on the initial electronic signal and by superimposing the initial electronic signal onto the initial grip map;
    monitoring, continuously, the infrastructure service area;
    instructing the one or more unmanned aerial vehicles (UAVs) to survey the infrastructure service area by measuring a subsequent electronic signal from the wireless modem communicating directly with the UAV at a second time interval after the first time interval, wherein the electronic signal metric consists of signal strength, signal frequency and signal type; and
    determining a subsequent electronic signal mapping of the infrastructure service area by the one or more UAVs;
    analyzing, based on an enhanced disruption based mapping 2, the subsequent electronic signal mapping by leveraging a supervised machine learning model;
    comparing a difference between the initial signal grid map and the subsequent electronic signal map;
    identify, based on the supervised machine learning model, damage to the infrastructure area;
    outputting a result of the analysis; and
    executing actions based on the result, wherein the actions comprise of, calling residents of the one or more customer dwelling and for the one or more UAVs to repair one or more infrastructure service device in the field.

2. The computer-implemented method of claim 1, wherein the outputting of the result further includes one or more of an outage at one or more customer dwellings, one or more utility devices are inoperable, and one or more obstacles impeding a utility service crew and where to send the utility service crew.

3. The computer-implemented method of claim 1, wherein the-customer subscription type comprises of multi-tier pay rate subscription.

4. The computer-implemented method of claim 1, wherein the initial and the subsequent electronic signal mapping, further comprises of a signal of wireless network from a network device and IOT devices of a customer, wherein the wireless network utilizes IEEE 802.11 standard.

5. The computer-implemented method of claim 1, wherein monitoring the infrastructure service area further comprises:
receiving status data from, but is not limited to, utility sensors, news report, client self-reporting and weather website.

6. The computer-implemented method of claim 1, wherein the analysis further comprises:
determining power outages and/or interruptions based on differences in the initial electronic signal mapping and the subsequent electronic signal mapping.

7. The computer-implemented method of claim 1, wherein the result of the analysis further comprises, a screen display, alert on a smartphone and printed report.

8. A computer system for determining an infrastructure service interruption, the computer system comprising:
one or more computer processors;
one or more non-transitory computer readable storage media; and
program instructions stored on the one or more non-transitory computer readable storage media for execution by at least one of the one or more computer processors, the program instructions comprising the steps of:
determining an initial electronic signal mapping of an infrastructure service area based on an electronic signal metric and customer subscription type, wherein the infrastructure service area consists of one or more customer dwellings serviced by electrical power and internet service further comprising:
obtaining a top-down aerial view over the infrastructure service area;
instructing one or more unmanned aerial vehicle (UAVs) to survey the infrastructure service area by measuring the initial electronic signal from a wireless modem communicating directly with the one or more UAVs at a first time interval, wherein the electronic signal metric consists of signal strength, signal frequency and signal type; and
creating one or more grid points on an initial grid map, wherein the initial grid map contains the top-down aerial view based on the initial electronic signal and by superimposing the initial electronic signal onto the initial grip map;
monitoring, continuously, the infrastructure service area;
instructing the one or more unmanned aerial vehicles (UAVs) to survey the infrastructure service area by measuring a subsequent electronic signal from the wireless modem communicating directly with the UAV at a second time interval after the first time interval, wherein the electronic signal metric consists of signal strength, signal frequency and signal type; and
determining a subsequent electronic signal mapping of the infrastructure service area by using the one or more UAVs;
analyzing, based on an enhanced disruption based mapping 2, the subsequent electronic signal mapping by leveraging a supervised machine learning model;
comparing a difference between the initial signal grid map and the subsequent electronic signal map;
identify, based on the supervised machine learning model, damage to the infrastructure area;
outputting a result of the analysis; and
executing actions based on the result, wherein the actions comprise of, calling residents of the one or more customer dwelling and for the one or more UAVs to repair one or more infrastructure service device in the field.

9. The computer system of claim 8, wherein determining the initial electronic signal mapping further comprises of program instructions to send one or more UAVs to survey the infrastructure service area at an initial time interval.

10. The computer system of claim 8, wherein the analysis further comprises:
determining power outages and/or interruptions based on differences in the initial electronic signal mapping and the subsequent electronic signal mapping.

11. A computer program product for determining an infrastructure service interruption, the computer program product comprising:
one or more non-transitory computer readable storage media and program instructions stored on the one or more non-transitory computer readable storage media, the program instructions comprising the steps of:
determining an initial electronic signal mapping of an infrastructure service area based on an electronic signal metric and customer subscription type, wherein the infrastructure service area consists of one or more customer dwellings serviced by electrical power and internet service further comprising:
obtaining a top-down aerial view over the infrastructure service area;
instructing one or more unmanned aerial vehicle (UAVs) to survey the infrastructure service area by measuring the initial electronic signal from a wireless modem communicating directly with the one or more UAVs at a first time interval, wherein the electronic signal metric consists of signal strength, signal frequency and signal type; and
creating one or more grid points on an initial grid map, wherein the initial grid map contains the top-down aerial view, based on the initial electronic signal and by superimposing the initial electronic signal onto the initial grip map;
monitoring, continuously, the infrastructure service area;
instructing the one or more unmanned aerial vehicles (UAVs) to survey the infrastructure service area by measuring a subsequent electronic signal from the wireless modem communicating directly with the UAV at a second time interval after the first time interval, wherein the electronic signal metric consists of signal strength, signal frequency and signal type; and
determining a subsequent electronic signal mapping of the infrastructure service area by using the one or more UAVs;
analyzing, based on an enhanced disruption based mapping 2, the subsequent electronic signal mapping by leveraging a supervised machine learning model;
comparing a difference between the initial signal grid map and the subsequent electronic signal map;

identify, based on the supervised machine learning model, damage to the infrastructure area;

outputting a result of the analysis; and executing actions based on the result, wherein the actions comprise of, calling residents of the one or more customer dwelling and for the one or more UAVs to repair one or more infrastructure service device in the field.

12. The computer program product of claim 11, wherein the outputting of the result further includes one or more of an outage at one or more customer dwellings, one or more utility devices are inoperable, and one or more obstacles impeding a utility service crew and where to send the utility service crew.

13. The computer program product of claim 11, wherein the customer subscription type comprises of multi-tier pay rate subscription.

14. The computer program product of claim 11, wherein the initial electronic signal mapping, further comprises of a signal of wireless network from a network device and IOT devices of a customer, wherein the wireless network utilizes IEEE 802.11 standard.

15. The computer program product of claim 11, wherein monitoring the infrastructure service area further comprises:

program instructions to receive status data from, but is not limited to, utility sensors, news report, client self-reporting and weather website.

16. The computer program product of claim 11, wherein the analysis further comprises:

determining power outages and/or interruptions based on differences in the initial electronic signal mapping and the subsequent electronic signal mapping.

17. The computer program product of claim 11, wherein the result of the analysis further comprises, a screen display, alert on a smartphone and printed report.

* * * * *